(12) United States Patent
Murata

(10) Patent No.: US 6,470,004 B1
(45) Date of Patent: Oct. 22, 2002

(54) WIRELESS ASYNCHRONOUS TRANSFER MODE (ATM) COMMUNICATION SYSTEM

(75) Inventor: Yasukazu Murata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/200,797

(22) Filed: Nov. 27, 1998

(30) Foreign Application Priority Data

Nov. 28, 1997 (JP) ............................................... 9-328544

(51) Int. Cl.$^7$ ............................................... H04B 7/212
(52) U.S. Cl. ................... 370/347; 370/329; 370/348; 370/395.1; 370/442; 370/474
(58) Field of Search ................................ 370/310, 328, 370/329, 330, 345, 347, 348, 349, 395, 433, 437, 438, 439, 442, 443, 458, 459, 462, 474, 475, 476; 455/450, 464, 509

(56) References Cited

U.S. PATENT DOCUMENTS

| | | | | |
|---|---|---|---|---|
| 5,533,019 A | * | 7/1996 | Jayapalan | 370/652 |
| 5,638,371 A | * | 6/1997 | Raychaudhuri et al. | 370/374 |
| 5,719,859 A | * | 2/1998 | Kobayashi et al. | 370/347 |
| 5,729,541 A | | 3/1998 | Hamalainen et al. | 370/337 |
| 5,742,610 A | * | 4/1998 | Natarajan | 370/472 |
| 5,778,318 A | * | 7/1998 | Talarmo et al. | 455/452 |
| 6,052,371 A | * | 4/2000 | Lemieux | 370/395 |
| 6,052,594 A | * | 4/2000 | Chuang et al. | 455/450 |

FOREIGN PATENT DOCUMENTS

| | | |
|---|---|---|
| JP | 4-68722 | 3/1992 |
| JP | 6-244862 | 9/1994 |
| JP | 7-107546 | 4/1995 |
| JP | 7-336774 | 12/1995 |
| JP | 9-18435 | 1/1997 |
| JP | 9-83518 | 3/1997 |
| JP | 9-247168 | 9/1997 |

\* cited by examiner

*Primary Examiner*—Hassan Kizou
*Assistant Examiner*—Saba Tsegaye
(74) *Attorney, Agent, or Firm*—Foley & Lardner

(57) ABSTRACT

A wireless ATM communication system capable of improving a transmission efficiency of a radio section, in which the TDMA transmission system is employed, is realized. In a down like communication executed from a base station to terminal stations, an idle portion of data channel allocated to other user can be used when excess ATM cells are to be transmitted. The slot position information of data channel of other user, which can be used for excess ATM cells transfer of own data, is contained in the control channel and notified to the terminal station. The terminal station extracts data in the slot position of data channel of other user indicated by the control channel in addition to data extract from own data channel allocated at the time of connection establishment.

3 Claims, 4 Drawing Sheets

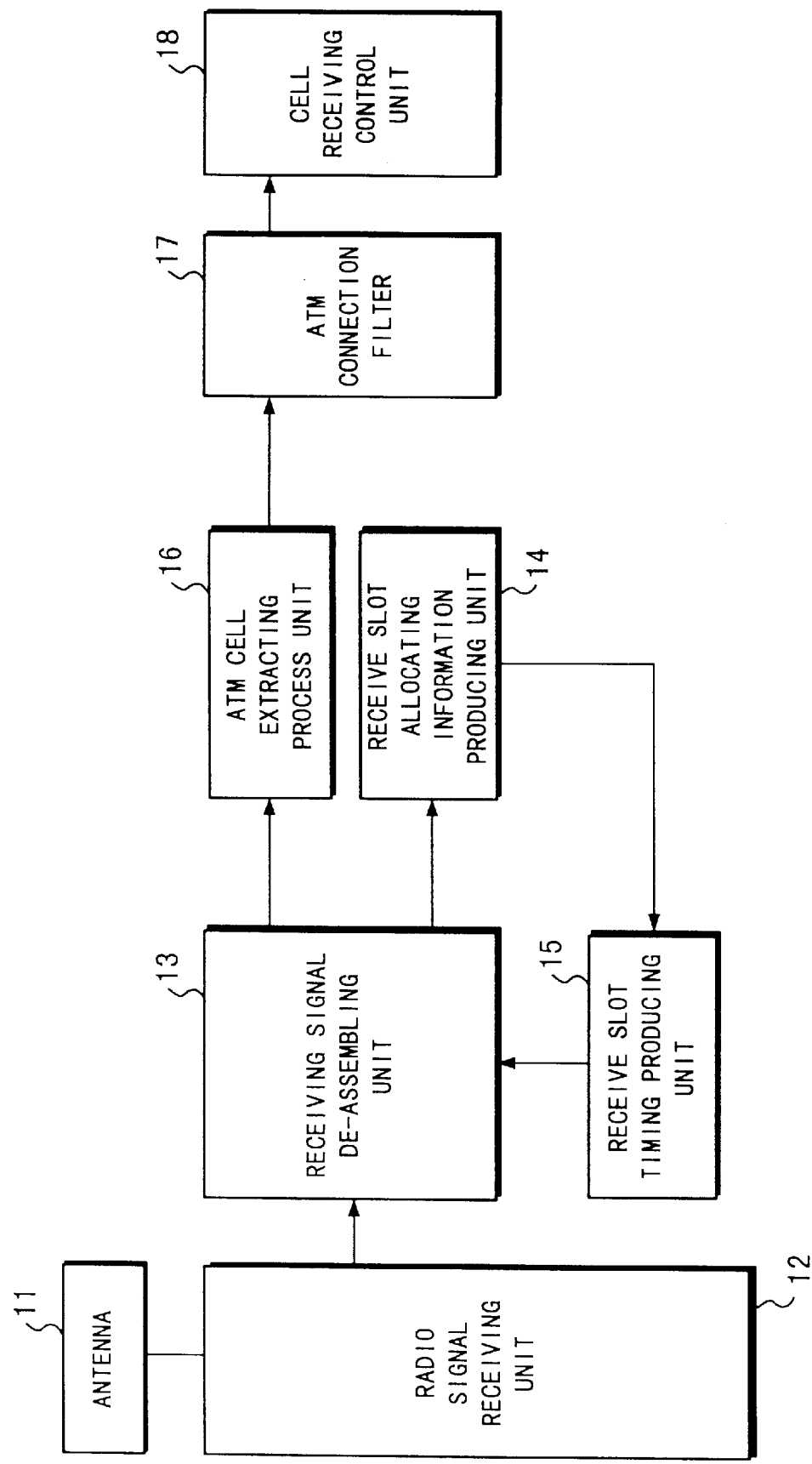

WIRELESS ASYNCHRONOUS TRANSFER MODE (ATM) COMMUNICATION SYSTEM

BACKGROUND OF THE INVENTION

1. Field of the Invention

The present invention relates to a wireless (radio) ATM (Asynchronous Transfer Mode) communication system, and more particularly, to a wireless ATM communication system capable of improving a transmission efficiency of a radio section in which the TDMA (Time Division Multiple Access) transmission system is employed.

2. Description of the Related Art

As to wireless ATM communication systems employing the TDMA transmission system in the radio section, the following communication systems have been proposed.

Japanese Patent Application Laid-open No. Hei 9-83518 discloses the method for effectively transmitting ATM cells by a form of the TDMA data burst in the TDMA transmission system between a terrestrial communication network and a satellite communication network with suppressing deterioration of transmission quality caused by the CDV (Cell Delay Variation).

Japanese Patent Application Laid-open No. Hei 9-18435 discloses the system which improves a transmission efficiency in a radio section of a wireless ATM communication system by allocating a single burst as to the down link transmission (namely, direction from a base station to a terminal station), and allocating dynamically the bursts based upon the ALOHA access control theory as to the up link transmission (namely, direction from a terminal station to a base station) in the TDMA transmission system.

Japanese Patent Application Laid-open No. Hei 7-336774 discloses the TDMA mobile telephone system which is flexible for allocating the time slots reserved for the packet data transmission and capable of varying the number of the time slots of the TDMA frame as required.

In the conventional wireless ATM communication system employing the TDMA transmission system in the radio section, in which slots or bursts on TDMA frame of the user channels usable for the respective users are pre-determined through the control channels, and burst data of "k" pieces of ATM cells is transmitted and received via this user channel, "n" (n≧1) of user channels are fixedly assigned when the connection is established. As a consequence, when no data is transmitted, or when not all of the assigned bursts are utilized for data transmission due to throughput of data to be transmitted is less than maximum throughput usable in reserved user channel, not all the assigned user channels are used for data transmission and causing deterioration of usage efficiency of transmission resources.

SUMMARY OF THE INVENTION

The present invention has been made to solve the above-mentioned conventional problems, and therefore, has an object to provide a wireless ATM communication system capable of improving a transmission efficiency of a radio section in which the TDMA transmission system is employed.

An idle portion of user data channel allocated to a certain user can be used when excess ATM cells are to be transmitted by other user. The slot position information of user data channel of other user, which can be used for excess ATM cells transfer of own data, is contained in the control channel and notified to the terminal station. The terminal station extracts data in the slot position of user data channel of other user indicated by the control channel in addition to data extract from own user data channel allocated at the time of connection establishment.

To achieve the above-described object, a wireless ATM communication system, according to an aspect of the present invention, is featured by such a wireless ATM communication system transmitting and receiving data of ATM cells by a radio system employing the TDMA system comprises a base station for assigning a data channel for a user who has requested connection establishment, for assigning a part of user channel being assigned to other user but not used all part of the user channel as an additional user channel when amount of data to be transmitted from the base station being detected to be too large to carry by the assigned user channel, and for transmitting a control channel in which slot positions of the additional user channel is indicated; and a terminal station for detecting use of additional user channel indicated in the control channel, and for receiving the data in designated slot positions of the additional user channel in addition to the data in the user channel assigned for own station.

The base station according to the present invention comprises data management means for detecting amount of data to be transmitted for each terminal station when commencing data communication with one of terminal stations, for allocating additional user channel, which has allocated to other terminal station but containing available portion not used, to the terminal station when an allocated user channel to the terminal station.: being not enough to carry amount of data to be transmitted to the terminal station, and for outputting user channel allocation information; and data assembling means for assembling slot position information of the additional user channel in a control channel, for assembling ATM cells to be transmitted to the terminal station in the allocated user channel and designated portion of the additional user channel, and for producing a TDMA frame including the control channels and user data channels to be transmitted to the terminal stations.

The terminal station according to the present invention comprises receive signal de-assembling means for de-assembling a TDMA frame transmitted from the base station into control channels and user channels, and for discriminating channels for own terminal station; receive slot allocation information producing means for extracting slot positional information of the allocated user channel and the additional user channel indicated in the control channel output from the receive signal de-assembling means; receive slot timing producing means for providing timing signal to the receive signal de-assembling means for extracting user data from user channels; ATM cell extracting process means for extracting ATM cells from the user data extracted from the receive signal de-assembling means; and ATM cell processing means for filtering ATM cells directed to own terminal station among ATM cells extracted by the ATM cell extracting process means based upon header information of each ATM cell, and for processing the filtered ATM cells as received data.

BRIEF DESCRIPTION OF THE DRAWINGS

FIG. 4 is a block diagram showing one structural example of the terminal station indicated in FIG. 1.

DETAILED DESCRIPTION OF PREFERRED EMBODIMENTS

Referring now to drawings, embodiments of the present invention will be described.

Figure 1:
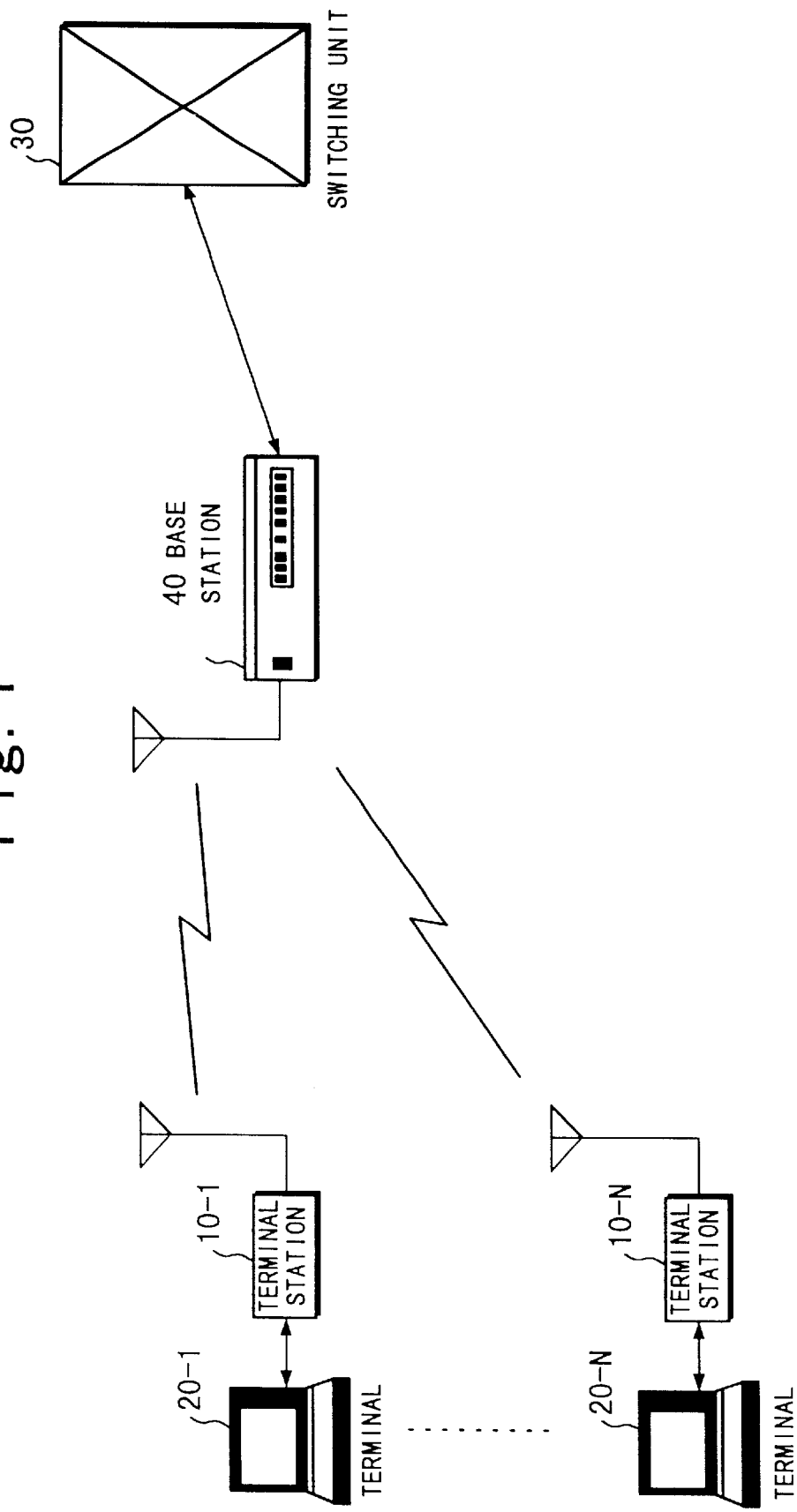
FIG. 1 is a diagram showing an arrangement of a system to which a wireless ATM communication system according to the present invention is applied.

FIG. 1 is a diagram indicating a system arrangement to which the wireless (radio) ATM communication system of the present invention is applied.

As indicated in FIG. 1, this system is arranged by a plurality of terminal stations 10-1 to 10-N connected to terminals 20-1 to 20-N respectively; a switching unit 30 for switching communication path for data between terminal stations 10-1 to 10-N; and a base station 40 for transmitting the data sent from the switching unit 30 to the relevant terminal station among the terminal stations 10-1 to 10-N, and also for receiving the data sent from the terminal stations 10-1 to 10-N to the switching unit 30. It should be noted that as to the terminals 20-1 to 20-N and the terminal stations 101 to 10-N, the total numbers thereof are not limited to the plural numbers, but at least one may be provided.

Next, communication operations executed by the wireless ATM communication system according to the present invention will now be explained.

When data for the terminal stations 10-1 to 10-N is transferred from the switching unit 30 to the base station 40, the base station 40 judges the destination of data, and then, the base station 40 transmits this data to the relevant terminal station by utilizing a user channel which has been assigned for the terminal station when a connection was established.

In this embodiment, it is assumed that data is transferred from the switching unit 30 via the base station 40 to the terminal station 10-1.

In the base station 40, the user channels which can be used in the terminal 10-1 are managed. When it is detected at the time of data transfer that a throughput larger than the user channels allocated to the terminal station 10-1 is required, the base station 40 monitors whether or not there is an available capacity for a unit of ATM cell in the user channels used by other users. When there is such an available capacity in the user channel of a certain user, a slot position of another user channel available for use is notified through the control channel to the terminal station 10-1. Thereafter, the ATM cell is multiplexed and transmitted through the slots of another user channel as well as user channel originally allocated for the terminal station 10-1.

In the terminal station 10-1, data (ATM cells) is received through the pre-allocated user channel and an additional user channel notified as described above, and data transferred through such an additional user channel is recognized whether or not the ATM cell is to be received by own terminal station based upon the header information of the ATM cell, and extracts the cell directed to the own terminal station so as to receive this cell.

Subsequently, more detail embodiment will now be described.

Figure 2:
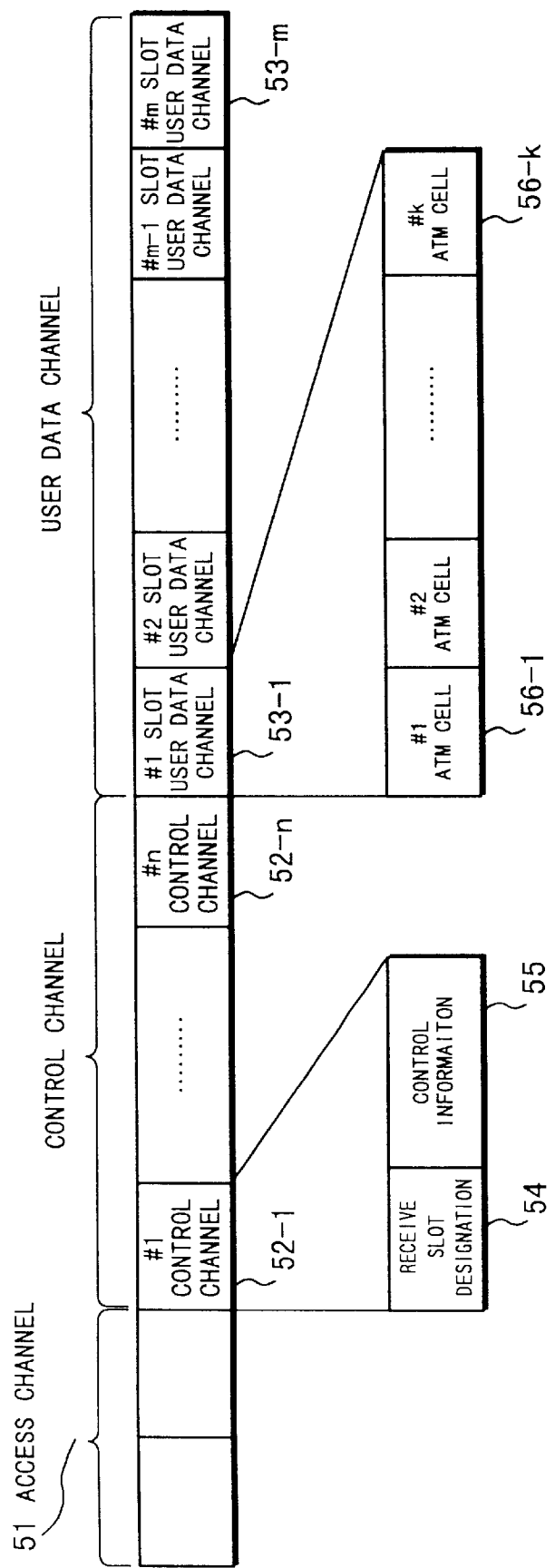
FIG. 2 is a diagram representing a frame structure of data, according to an embodiment, which is transmitted/received between the terminal station and the switching unit shown in FIG. 1.

FIG. 2 is a diagram representing a frame structure of data, according to an embodiment, which is transmitted and received between the terminal stations 10-1 to 10-N and the switching unit 30 shown in FIG. 1.

As represented in FIG. 2, the frame, according to this embodiment, is arranged by an access channel 51; "n" pieces of control channels 52-1 to 52-n; and "m" pieces of user data channels 53-1 to 53-m. Each of the control channels 52-1 to 52-n is constituted by a receive slot designation 54, and control information 55. Into this receive slot designation 54, user channel information (slot number) when a user channel other than the pre-assigned user channel is used is indicated. Into the control information 55, control information related to a communication process operation is stored. Each of the user data channels 53-1 to 53-m is constituted by "k" pieces of ATM cells 56-1 to 56-k.

Figure 3:
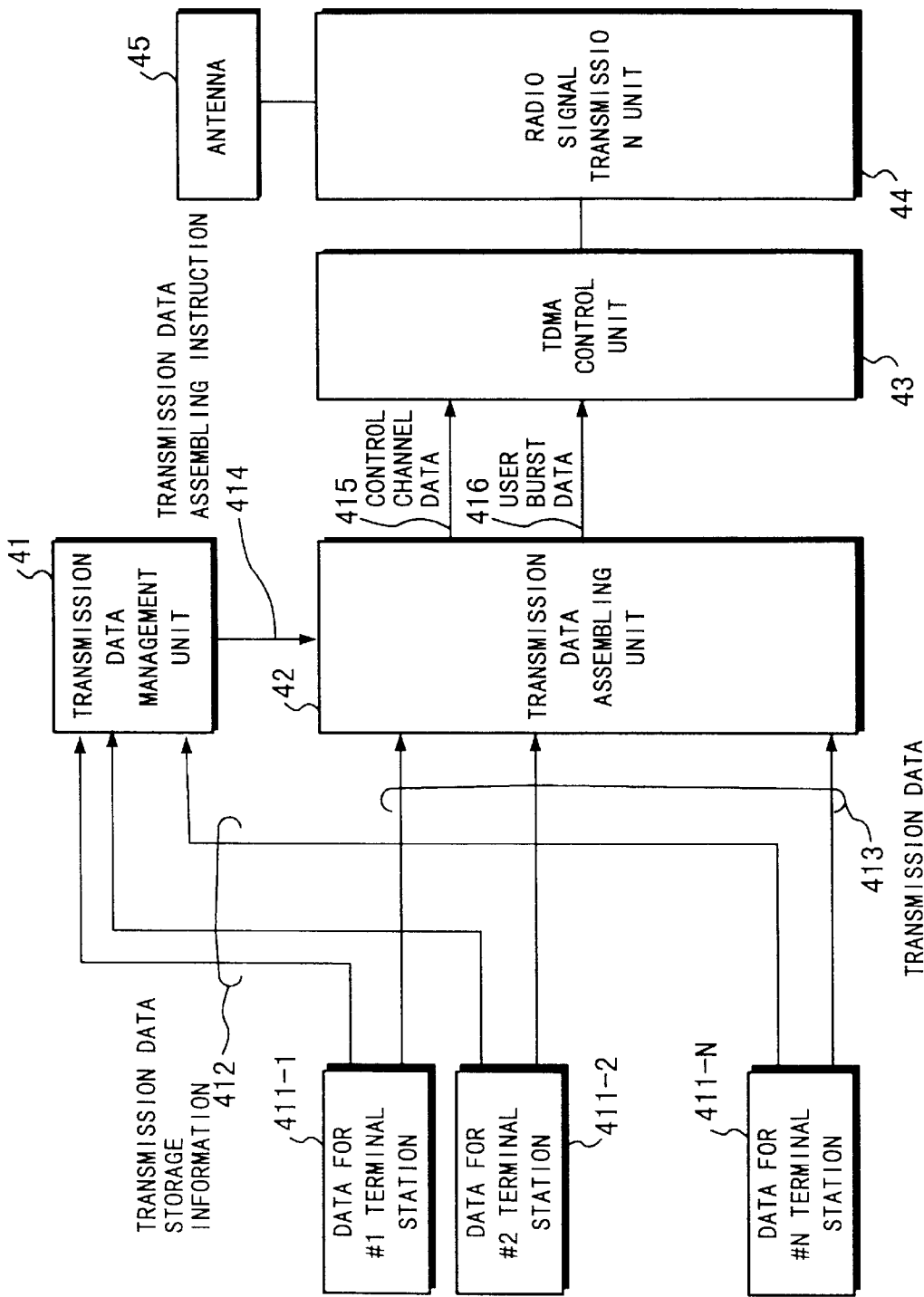
FIG. 3 is a block diagram representing one structural example of the base station indicated in FIG. 1.

FIG. 3 is a block diagram representing one structural example of the base station 40 shown in FIG. 1.

As represented in FIG. 3, the base station 40 in this embodiment is arranged by a transmission data management unit 41, a transmission data assembling unit 42, a TDMA control unit 43, and a radio signal transmission unit 44. This transmission data management unit 41 manages data 411-1 to 411-N for the terminal stations as transmission data storage information 412 which indicates whether or not data is present, and also an amount of data. The transmission data management unit 41 detects such a condition that all of the assigned user data channels are used, and also detects an available capacity in a user data channel assigned to another terminal station based upon the transmission data storage information 412. This available capacity in the user data channel implies such a user channel which is not used at this stage, or such a channel being used but having idle slots for extra ATM cells other than own user data. Furthermore, based upon this detection result, this transmission data management unit 41 outputs a transmission data assembling instruction 414 which includes information of instructing ATM cell insertion into an allocated user data channel and information of indicating available slot position in a user data channel of another terminal station. The data 411-1 to 411-N for the terminal stations as transmission data 413 and the transmission data assembling instruction 414 are input into the transmission data assembling unit 42, and in response to the transmission data assembling instruction 414, the transmission data assembling unit 42 assembles and outputs the control channel data 415 and user burst data 416 in the format as shown in the control channel 52 and the user data channel 53 of FIG. 2. The TDMA: control unit 43 produces the frame to be transmitted to the terminal stations 10-1 to 10-N, as shown in FIG. 2, based upon the control channel data 415 and the user burst data 416 output from the transmission data assembling unit 42. The radio signal transmission unit 44 transmits the frame produced by the TDMA control unit 43 via an antenna 45.

A description will now be made of operations of the base station 40 with employment of the above-described arrangement.

When ATM cells are transmitted from the switching unit 30, this transmitted ATM cells are managed as the data for terminal stations 411-1 to 411-N. Among these data 411-1 to 411-N directed to the terminal station, the transmission data storage information 412 for indicating as to whether or not the data is present and also the data amount is input into the transmission data management unit 41, and the transmission data 413 is input into the transmission data assembling unit 42.

As a consequence, based upon the transmission data storage information 412, the information for designating the user data channels 53-1 to 53-m (see FIG. 2) to be used for data transmission to a destination terminal station is notified by the transmission data management unit 41 as the transmission data assembling instruction 414 to the transmission data assembling unit 42. When it is detected that not enough capacity is available in the pre-determined user data channel, in the transmission data management unit 41, an idle condition of other user data channels are monitored and available slot/slots of data channel of other user is selected. This slot information of the data channel for other user is also notified as the transmission data assembling instruction 414 to the transmission data assembling unit 42.

Next, in the transmission data assembling unit 42, the control channels 52-1 to 52-n (see FIG. 2) directed to the respective terminal stations and also the user data channels 53-1 to 53-m (see FIG. 2) are assembled in response to the transmission data assembling instruction 414 notified from the transmission data management unit 41. In this case, in the respective control channels 52-1 to 52-n (see FIG. 2), the slot position information of the data channel of other user is stored into the field of receive slot designation 54 (see FIG. 2).

When both the control channels 52-1 to 52-n (see FIG. 2) directed to the respective terminal stations and the user data channels 53-1 to 53-m (see FIG. 2) are assembled in the transmission data assembling unit 42, the assembled control channels 52-1 to 52-n (see FIG. 2) is notified as the control channel data 415 to the TDMA control unit 43. Also, the assembled user data channels 53-1 to 53-m (see FIG. 2) is notified as the user burst data 416 to the TDMA control unit 43.

Next, in the TDMA control unit 43, the TDMA frame as shown in FIG. 2 is produced based upon the control channel data 415 and the user burst data 416 notified from the transmission data assembling unit 42. The TDMA frame produced in the TDMA control unit 43 is transmitted via the wireless transmitting unit 44 and the antenna 45.

FIG. 4 is a block diagram for indicating a structural example of the terminal stations 10-1 to 10-N indicated in FIG. 1.

As shown in FIG. 4, each of the terminal stations 10-1 to 10-N, according to this embodiment, is arranged by a radio signal receiving unit 12, a receiving signal de-assembling unit 13, a receive slot: allocating information producing unit 14, a receive slot timing producing unit 15, an ATM cell extracting process unit 16, and an ATM connection filter 17. The radio signal receiving unit 12 receives a TDMA frame transmitted from the base station 40 via an antenna 11. The receiving signal de-assembling unit 13 de-assembles the TDMA frame received by the radio signal receiving unit 12 into a control channel and also a user data channel which are directed to the own terminal station. The receive slot allocating information producing unit 14 extracts the slot position information of the user data channel of other user based on the information stored in the receiving slot designation field 54 of the control channel, and the slot position information of the pre-allocated own user data channel. Then, this receive slot allocating information producing unit 14 outputs the extracted slot position information for indicating slot position in which ATM cells to be received are contained. In response to the slot position information output from the receive slot allocating information producing unit 14, the receive slot timing producing unit 15 notifies the slot timing (or slot position) of the user data channel to be extracted in the received TDMA frame to the receiving signal de-assembling unit 13. The ATM cell extracting process unit 16 enters thereinto the user data of the user data channel in the TDMA frame separated by the receiving signal de-assembling unit 13, and extracts the ATM cells 56-1 to 56-k (see FIG. 2) from the input user data. The ATM connection filter 17 to which the ATM cells 56-1 to 56-k (see FIG. 2) extracted by the ATM cell extracting process unit 16 are input, and judges as to whether or not each ATM cell is directed to the own terminal station based upon the header information of the ATM cell. When the input ATM cell is directed to the own terminal station, the ATM connection filter 17 transfers this ATM cell to the cell receiving control unit 18.

Next, operations of the terminal stations 10-1 to 10-N with the above-described arrangement will now be described.

When the TDMA frame transmitted from the base station 40 is received via the antenna 11 and the radio signal receiving unit 12, the control channels 52-1 to 52-n (see FIG. 2) are separated from the user data channels 53-1 to 53-m (see FIG. 2) in the receiving signal de-assembling unit 13 in response to the notification from the receive slot timing producing unit 15.

The control channels 52-1 to 52-n (see FIG. 2) separated in the receiving signal de-assembling unit 13 is entered into the receive slot allocating information producing unit 14. The receive slot allocating information producing unit 14 extracts both the slot position information of the pre-allocated user data channel and the slot position information of the data channel of other user, which has been stored in the receive slot designation field 54 of the control channel (see FIG. 2), and then notifies both the extracted slot position information to the receive slot timing producing unit 15.

The user data is extracted in response to the slot position information from the user data channel in the receiving signal de-assembling unit 13, and are entered into the ATM cell extracting process unit 16. In this ATM cell extracting process unit 16, the ATM cells 56-1 to 56-k (see FIG. 2) are extracted from the input user data.

Thereafter, the ATM cells 56-1 to 56-k (see FIG. 2) extracted in the ATM cell extracting process unit 16 are transferred to the ATM connection filter 17. This ATM connection filter 17 judges as to whether or not each of the transferred ATM cell is directed to the own station based upon the header information of each ATM cell. When the ATM cell is directed to the own station, this ATM cell is transferred to the cell receive control unit 18.

As previously described, in accordance with the present invention, while the communication is carried out from the base station to the terminal station, namely the down link communication, the system is arranged in such a manner that excess ATM cells are transferred by utilizing the available capacity of the user data channel assigned to other user. Accordingly, the use efficiency of the transmission in the radio section can be improved. Also, since the user data channel on the down link is previously allocated for each user when the connection was established, the availability of this user channel is assured as long as there is such data to be transferred and conveying the minimum traffic is guaranteed. Also, in such a case that there is an idle portion in the data channel allocated to other user, since the data transfer with using this idle portion is available, it is possible to transfer the data in the throughput larger than the previously secured throughput.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A wireless Asynchronous Transfer Mode (ATM) communication system transmitting and receiving data of ATM cells by a radio system employing Time Division Multiple Access (TDMA) system, comprising:

a base station for assigning a data channel for a user who has requested connection establishment, for assigning a part of user channel being assigned to other user but not used all part of the user channel as an additional user channel when amount of data to be transmitted from said base station being detected to be too large to carry by said assigned user channel, and for transmitting a control channel in which slot positions of said additional user channel being indicated; and a terminal station for detecting use of additional user channel indicated in said control channel, and for receiving the data in designated slot positions of said additional user channel in addition to the data in the user channel assigned for own station, wherein said base station further comprising:

data management means for detecting amount of data to be transmitted for each terminal station when commencing data communication with one of terminal stations, for allocating additional user channel, which has allocated to other terminal station but containing available portion not used, to said terminal station when an allocated user channel to said terminal station being not enough to carry amount of data to be transmitted to said terminal station, and for outputting user channel allocation information; and data assembling means for assembling slot position information of the additional user channel in a control channel, for assembling ATM cells to be transmitted to said terminal station in the allocated user channel and designated portion of the additional user channel, and for producing a TDMA frame including the control channels and user data channels to be transmitted to the terminal stations.

2. A wireless Asynchronous Transfer Mode (ATM) communication system transmitting and receiving data of ATM cells by a radio system employing Time Division Multiple Access (TDMA) system, comprising:

a base station for assigning a data channel for a user who has requested connection establishment, for assigning a part of user channel being assigned to other user but not used all part of the user channel as an additional user channel when amount of data to be transmitted from said base station being detected to be too large to carry by said assigned user channel, and for transmitting a control channel in which slot positions of said additional user channel being indicated; and a terminal station for detecting use of additional user channel indicated in said control channel, and for receiving the data in designated slot positions of said additional user channel in addition to the data in the user channel assigned for own station, wherein said terminal station further comprising:

receive signal de-assembling means for de-assembling a TDMA frame transmitted from said base station into control channels and user channels, and for discriminating channels for own terminal station;

receive slot allocation information producing means for extracting slot positional information of the allocated user channel and the additional user channel indicated in the control channel output from said receive signal de-assembling means;

receive slot timing producing means for providing timing signal to said receive signal de-assembling means for extracting user data from user channels;

ATM cell extracting process means for extracting ATM cells from the user data extracted from said receive signal de-assembling means; and ATM cell processing means for filtering ATM cells directed to own terminal station among ATM cells extracted by said ATM cell extracting process means based upon header information of each ATM cell, and for processing the filtered ATM cells as received data.

3. A wireless Asynchronous Transfer Mode (ATM) communication system transmitting and receiving data of ATM cells by a radio system employing the Time Division Multiple Access (TDMA) system comprising;

a base station comprising;

data management means for detecting amount of data to be transmitted for each terminal station when commencing data communication with one of terminal stations, for allocating additional user channel, which has allocated to S other terminal station but containing available portion not used, to said terminal station when an allocated user channel to said terminal station being not enough to carry amount of data to be transmitted to said terminal station, and for outputting user channel allocation information; and data assembling means for assembling slot position information of the additional user channel in a control channel, for assembling ATM cells to be transmitted to said terminal station in the allocated user channel and designated portion of the additional user channel, and for producing a TDMA frame including the control channels and user data channels to be transmitted to the terminal stations; and a terminal station comprising;

receive signal de-assembling means for de-assembling a TDMA frame transmitted from said base station into control channels and user channels, and for discriminating channels for own terminal station;

receive slot allocation information producing means for extracting slot positional information of the allocated user channel and the additional user channel indicated in the control channel output from said receive signal de-assembling means;

receive slot timing producing means for providing timing signal to said receive signal de-assembling means for extracting user data from user channels;

ATM cell extracting process means for extracting ATM cells from the user data extracted from said receive signal de-assembling means; and ATM cell processing means for filtering ATM cells directed to own terminal station among ATM cells extracted by said ATM cell extracting process means based upon header information of each ATM cell, and for processing the filtered ATM cells as received data.

* * * * *